United States Patent [19]
Ladner et al.

[11] Patent Number: 6,075,458
[45] Date of Patent: *Jun. 13, 2000

[54] LOCATOR DEVICE

[75] Inventors: David L. Ladner, Minneapolis; Andrea J. Grazzini, Eagan, both of Minn.

[73] Assignee: Peoplenet, Inc., Minneapolis, Minn.

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/842,208

[22] Filed: Jan. 10, 1997

Related U.S. Application Data

[63] Continuation of application No. 08/332,351, Oct. 31, 1994, Pat. No. 5,594,425.

[51] Int. Cl.[7] .......................................... H04Q 1/00
[52] U.S. Cl. ................. 340/825.49; 340/825.44; 340/825.47; 342/457
[58] Field of Search ................. 340/825.06, 825.44, 340/825.45, 825.49, 572, 573, 905, 991; 342/357, 457

[56] References Cited

U.S. PATENT DOCUMENTS

| | | | |
|---|---|---|---|
| 4,057,794 | 11/1977 | Grossfield | 364/311 |
| 4,384,288 | 5/1983 | Walton | 340/825.34 |
| 4,706,689 | 11/1987 | Man | 128/903 |
| 4,742,357 | 5/1988 | Rackley | 342/457 |
| 4,797,948 | 1/1989 | Milliorn et al. | 455/54 |
| 4,827,395 | 5/1989 | Anders et al. | 364/138 |
| 4,837,700 | 6/1989 | Ando et al. | 364/449 |
| 4,924,402 | 5/1990 | Ando et al. | 364/449 |
| 4,952,925 | 8/1990 | Carroll et al. | 340/825.54 |
| 4,998,095 | 3/1991 | Shields | 340/574 |
| 5,003,317 | 3/1991 | Gray et al. | 342/457 |
| 5,119,102 | 6/1992 | Barnard | 342/257 |
| 5,142,281 | 8/1992 | Park | 340/991 |
| 5,155,689 | 10/1992 | Wortham | 364/460 |
| 5,208,756 | 5/1993 | Song | 364/449 |
| 5,218,367 | 6/1993 | Sheffer et al. | 342/457 |
| 5,218,716 | 6/1993 | Comroe et al. | 455/33.4 |
| 5,221,925 | 6/1993 | Cross | 340/998 |
| 5,223,844 | 6/1993 | Mansell et al. | 342/357 |
| 5,225,842 | 7/1993 | Brown et al. | 342/357 |
| 5,235,633 | 8/1993 | Dennison et al. | 379/60 |
| 5,299,132 | 3/1994 | Wortham | 364/460 |
| 5,311,197 | 5/1994 | Sorden et al. | 342/457 |
| 5,355,511 | 10/1994 | Hatano et al. | 455/11.1 |
| 5,365,451 | 11/1994 | Wang et al. | 364/449 |
| 5,379,224 | 1/1995 | Brown et al. | 364/449 |
| 5,392,052 | 2/1995 | Eberwine | 342/357 |
| 5,398,190 | 3/1995 | Wortham | 364/460 |
| 5,422,816 | 6/1995 | Sprague et al. | 364/449 |
| 5,452,211 | 9/1995 | Kyrtsos et al. | 364/449 |
| 5,525,969 | 6/1996 | LaDue | 340/573 |
| 5,594,740 | 1/1997 | LaDue | 379/59 |
| 5,845,203 | 12/1998 | LaDue | 455/414 |

FOREIGN PATENT DOCUMENTS 2 125 497   3/1984   United Kingdom .

*Primary Examiner*—Brian Zimmerman
*Attorney, Agent, or Firm*—Westman, Champlin & Kelly, PA

[57] ABSTRACT

A locator apparatus includes a receiver for receiving location information indicative of a location of the receiver. A memory is coupled to the receiver and stores the location information. A cellular transmitter is coupled to the memory and the receiver and transmits the location information to a second receiver. A data processing station processes the location information to determine the location of the receiver.

11 Claims, 4 Drawing Sheets

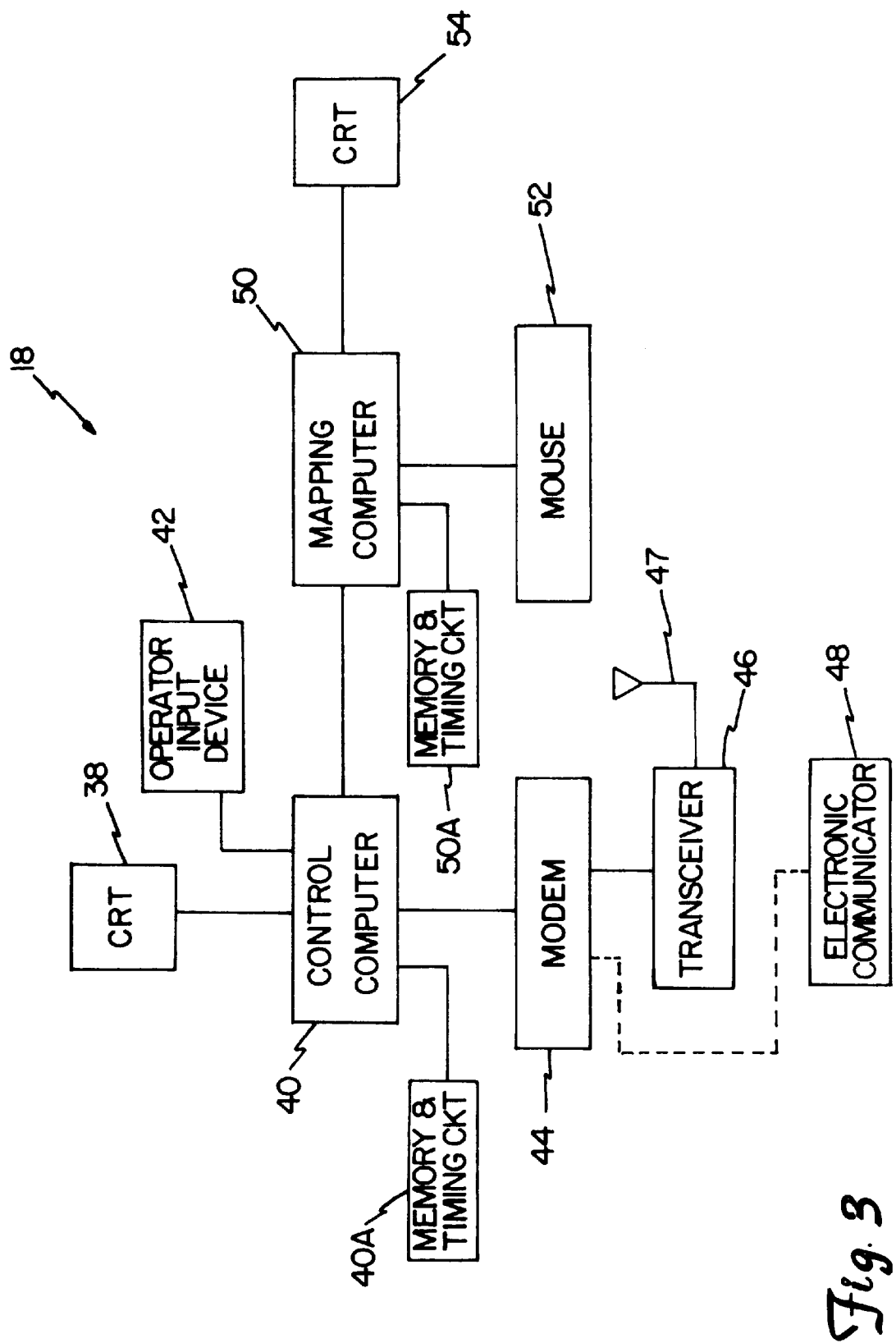

LOCATOR DEVICE

This is a continuation of application Ser. No. 08/332,351, filed Oct. 31, 1994 now U.S. Pat. No. 5,594,425. Priority of the prior application is claimed pursuant to 35 USC § 120.

BACKGROUND OF THE INVENTION

The present invention is drawn to a locator system. More particularly, the present invention is drawn to a locator device for locating a desired item based on satellite location information, and utilizing a cellular communication network.

It is presently difficult to locate and accurately track the movement of mobile items such as automobiles, pets, and people. However, given the present concern over abductions and car thefts, it is highly desirable to be able to quickly, efficiently and accurately determine the location of mobile items, and track movement of the mobile items. Present systems for determining and tracking the location of mobile items are subject to a number of significant disadvantages. Further, once detected, there is presently no organized system or method by which the located entity can be recovered.

For instance, there are current locator systems which rely on two-way radio locating devices. In other words, the item to be located is first fitted with a radio transmitter. Persons who wish to locate the item are equipped with a radio receiver. By using certain well known techniques, the item to be located can be located based on the two-way radio communication which takes place between the transmitter and receiver. This system has significant disadvantages. First, location can only be accomplished within several hundred feet of the actual location of the item to be located. In addition, such two-way radio transmitters commonly have a very limited range. When the radio receiver is out of the transmitters range, location is essentially impossible.

A second method of locating utilizes a strictly cellular communications network to locate the item. The item to be located is fitted with a cellular transmitter and the item is located based on triangulation from a plurality of cell site transmitter towers. However, this method also has significant disadvantages. A third party must be employed to perform the triangulation technique in order to do any location, whatsoever. In addition, the accuracy of this type of location technique is dependent upon the power of the individual cell site in which triangulation is taking place. The accuracy can be anywhere between three blocks (or approximately 300 feet) and in excess of three miles. Further, the triangulation in such a system only covers the area in which the particular cellular transmitting tower is presently controlling the cellular communication. Finally, in more remote areas, there is a far greater geographic spread between cellular transmitter towers. This makes the triangulation technique even less accurate.

In addition, neither of the above-mentioned systems (either the two-way radio locator system, or the cellular triangulation locator system) provides any mechanism or system for processing location information once it is obtained from the item to be located. Thus, any response generated based on these signals would typically be slow and inefficient. Further, response times of such systems typically suffer because the mobile item to be located, by its very nature, is typically moving. Prior systems do not provide any efficient mechanisms for extrapolating to what is believed to be a future destination of the item to be located.

SUMMARY OF THE INVENTION

The present invention provides a locator apparatus which includes a first receiver for receiving location information indicative of the location of the receiver. A memory is coupled to the first receiver and stores the location information. A cellular transmitter is coupled to the memory and the first receiver. The cellular transmitter transmits the location information to a second receiver where the location information is processed.

In one embodiment, the location information received by the first receiver is based on satellite transmissions. Also, in another embodiment, the second receiver which receives the location information from the locator apparatus provides it to a tracking system which relates the location information to a map. A mapped output is thus provided which is indicative of the location of the receiver.

BRIEF DESCRIPTION OF THE DRAWINGS

FIG. 3 is a more detailed block diagram of a data processor station according to the present invention.

DETAILED DESCRIPTION OF THE PREFERRED EMBODIMENTS

Figure 1:
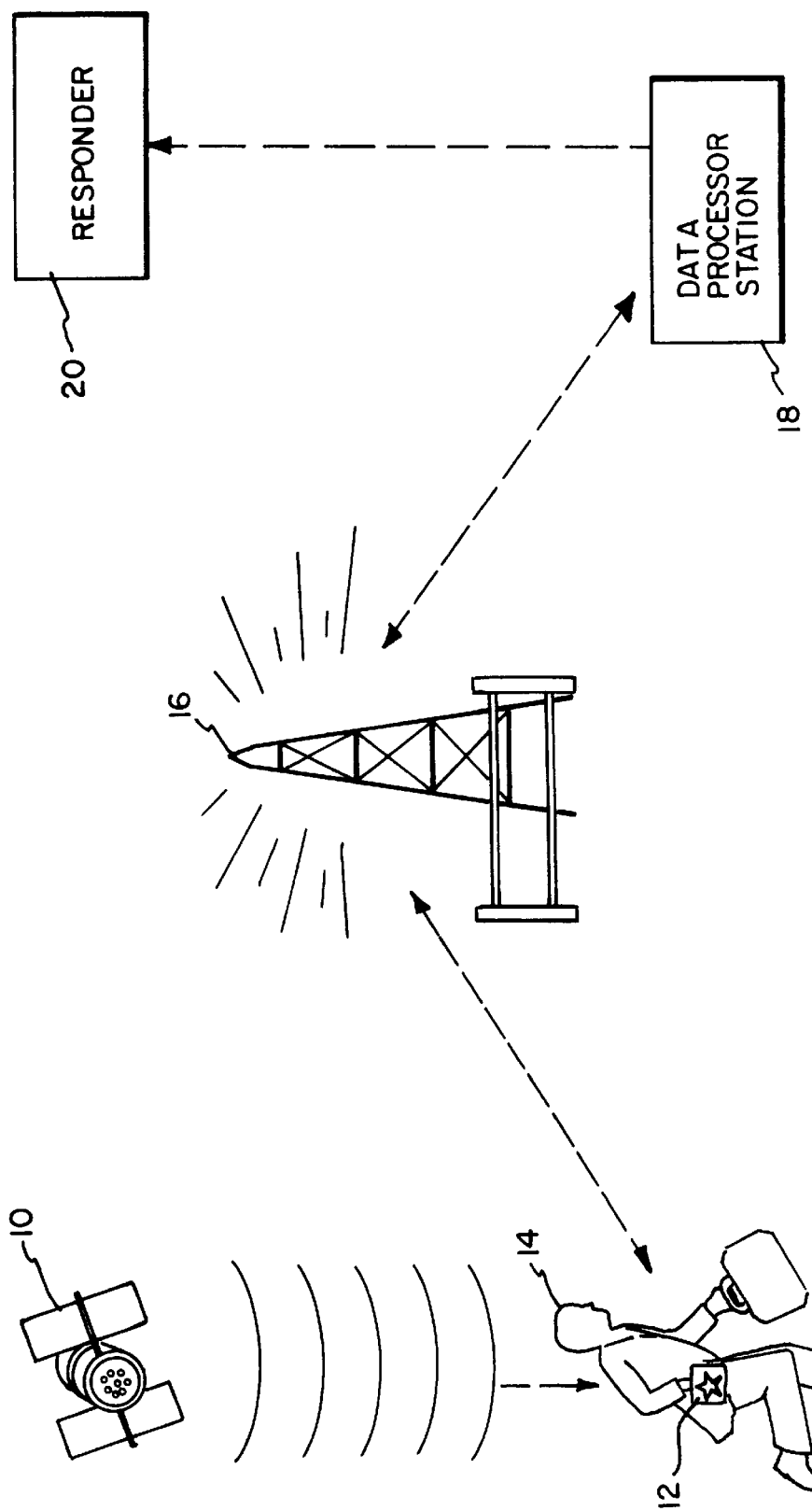
FIG. 1 is a schematic-type diagram of a system according to the present invention.

FIG. 1 is an overall schematic-type view illustrating the operation of a locator system according to the present invention. FIG. 1 includes satellite 10, portable locator 12 attached to a person 14, cellular transmitter tower 16, data processor station 18 and responder 20. In the preferred embodiment shown in FIG. 1, satellite 10 is a satellite in the Global Positioning System (GPS). Satellite 10 continuously transmits longitude, latitude, and altitude information coordinates to earth.

The person 14 has attached, by clothing or another suitable attachment mechanism, portable locator 12 according to the present invention. Portable locator 12 includes a satellite transmission receiver which receives the positional information (longitude, latitude and altitude coordinates) from satellite 10. The positional information is received by portable locator 12 and stored in a memory located in portable locator 12. Portable locator 12 periodically stores additional location information received from satellite 10, as the individual 14 carrying portable locator 12 moves about. In the preferred embodiment, fifty sets of location information are stored in portable locator 12 on a revolving basis. In other words, after all fifty memory locations contain position information, the oldest position information is deleted from the memory and the next update is stored in that memory location.

Upon the occurrence of one of two actions, transceiver 12 transmits the most recently stored position information via a cellular network to data processor station 18. A first action which results in the transmission of the position information is that transmission is activated by the individual 14 carrying portable locator 12. This instance typically occurs when individual 14 is in need of some type of assistance. Under such circumstances, individual 14 activates a switch or other suitable input device on portable locator 12. In response, portable locator 12 initiates cellular communication via a cellular transmitter tower (or cell site) 16. In one preferred embodiment, data processor station 18 is also equipped with a cellular transceiver. Thus, data processor station 18 is capable of communicating with portable locator 12 via a cellular network. When portable locator 12 transmits position information via the cellular network, data processor station 18 receives that information. It should also be noted that any suitable receiver can be used, such as a receiver based on wire-line communication. In that case, data processor station 18 simply interfaces with a public switched telephone network station which, in turn, interfaces with cellular transmitter tower 16.

A second circumstance which initiates the transfer of position information from portable locator 12 to data processor station 18 occurs when data processor station 18 interrogates portable locator 12 via cellular communication. This will be described in greater detail later in the specification. Briefly, data processor station 18 is preferably provided with an operator input device which allows an operator at data processor station 18 to initiate communication with portable locator 12. As an operator requests data processor station 18 to initiate such communication, data processor station 18 sends an interrogation signal, via the cellular communication network, to portable locator 12. In response to the interrogation signal, portable locator 12 transmits requested information from the memory in portable locator 12 to data processor station 18 via the cellular network.

After data processor station 18 receives position information from portable locator 12 (either by operator initiation or interrogation from data processor station 18), data processor station 18 processes the position information to determine what action is required by data processor station 18. The action taken by data processor station 18 primarily depends upon the reason for initiation of communication with portable locator 12. For instance, individual 14 can initiate an emergency communication in which data processor 18 takes one action. However, individual 14 can also initiate a second level, or normal, communication in which data is processor station 18 takes a second action. Further, if communication is initiated by data processor station 18, data processor station 18 may take yet another action in response to receiving position information from portable locator 12. All of these circumstances are described later in the specification.

Once data processor station receives the position information, it can generally be stated that data processor station 18 relates the position information to a map using a mapping system (such as mapping software). Data processor station 18 then sends this information, by any suitable means, to a responder 20.

Responder 20 is typically an individual or entity which is to be informed of the location of individual 14 based on the circumstance under which communication is initiated with portable locator 12. If individual 14 initiates an emergency communication by actuating portable locator 12, then responder 20 is typically the police or other emergency response personnel. However, if, for instance, individual 14 is not a person, but rather a pet, automobile, parcel, or other animate or inanimate object, an operator at data processor station 18 may be requested to locate the object carrying portable locator 12. In such a case, responder 20 would typically be the owner of the object and the location of the object would be provided to the owner to allow the owner to retrieve the object in due course.

Data processor station 18 typically communicates with responder 20 by sending an electronic communication over conventional wire line telephone lines and via modems. However, the operator of data processor station 18 can also telephone responder 20 and pass the relevant information via telephone. Other electronic communication apparatus can also be used, such as cellular telephones, telefacsimile machines, or any other suitable communication systems.

Figure 2:
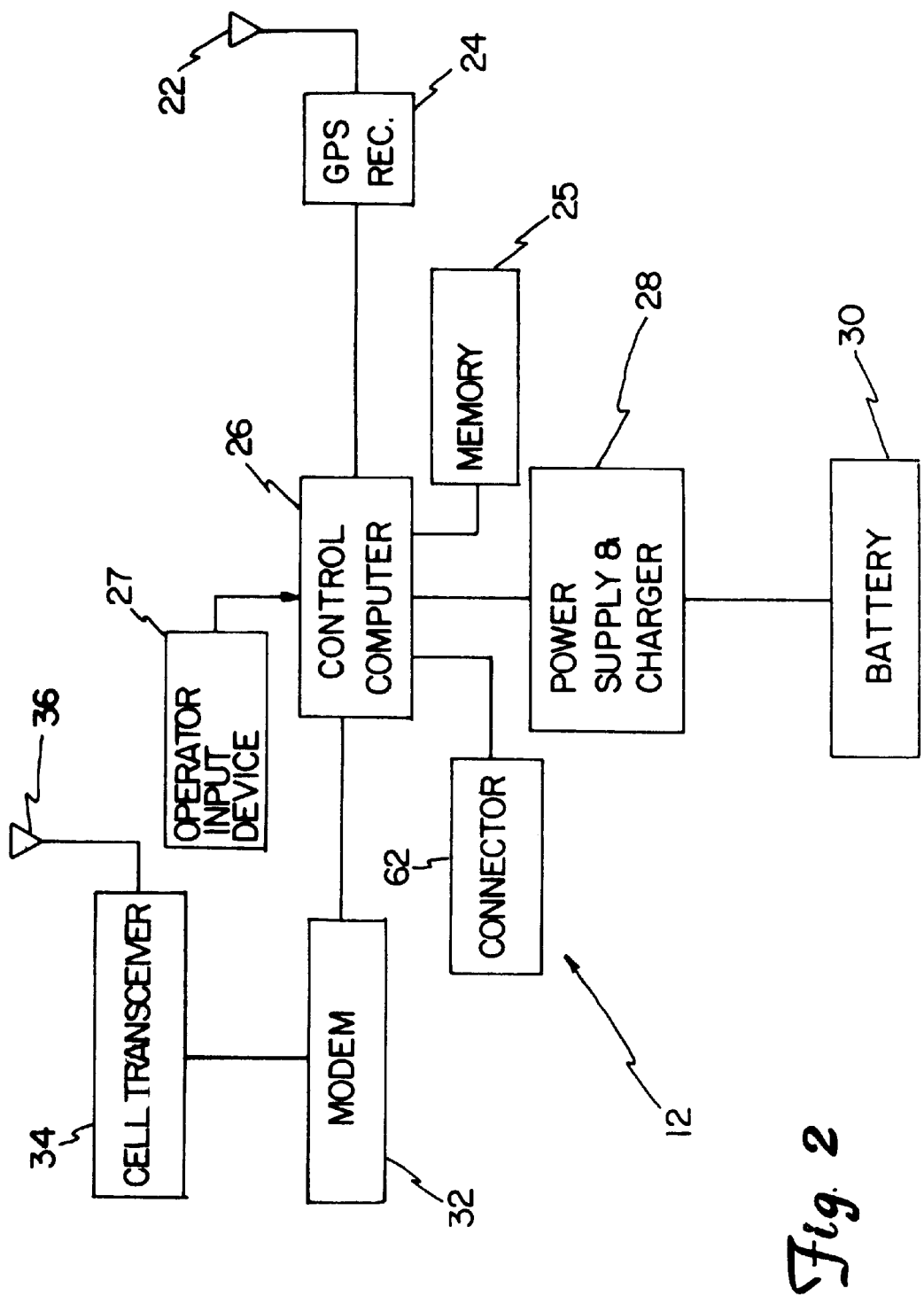
FIG. 2 is a more detailed block diagram of a portable locator unit according to the present invention.

FIG. 2 is a block diagram of portable locator 12 according to the present invention. Portable locator 12 includes satellite transmission antenna 22, GPS receiver 24, memory 25, control computer 26, operator input device 27, power supply and charger 28, battery 30, modulator/demodulator (modem) 32, cellular transceiver 34, cellular communication antenna 36, and connector 62. In operation, the position information transmitted by satellite 10 is received, through antenna 22, by GPS receiver 24. It should be noted that, in the preferred embodiment, receiver 24 is suitable for receiving from the GPS. However, receiver 24 could also be any other suitable satellite receiver for receiving position information from a satellite, such as a LORAN receiver.

The GPS receiver 24 decodes the satellite information and provides the decoded position information in digital form to control computer 26. Control computer 26 stores the position information in memory 25, along with the time and date when the position information was received. In the preferred embodiment, control computer 26 stores fifty sets of position information in memory 25, at predetermined time intervals, and then updates the information in memory 25 by erasing the oldest information in memory 25 and replacing it with the newest position information.

Power supply and charger 28, along with battery 30, supply power to the rest of portable locator 12 in a conventional manner.

Operator input device 27 typically includes a plurality of push button inputs. However, operator input device 27 can also include a membrane keypad input, or any other suitable operator input.

Once position information is stored in memory 25, and in response to an appropriate operator input from operator input device 27, control computer 26 retrieves position information from memory 25 and provides it in the form of position information signals to modem 32. Modem 32 modulates the position information signals and provides the modulated signals to cellular transceiver 34. Cellular transceiver 34 transmits the modulated position information signals, via antenna 36, and a cellular network (and optionally a wire-line network), to the data processor station 18.

Based on the particular operator input provided at operator input device 27, control computer 26 can also append an emergency indicator message to the signal transmitted by cellular transceiver 34. Also, based on the program instructions provided to control computer 26 (which are typically stored either in memory 25, or in a memory integral with control computer 26) control computer 26 may provide either the most recent position information stored in memory 25 in response to an operator input, or may provide all fifty of the saved position information sets stored in memory 25, or any combination thereof, to data processor station 18.

In the preferred embodiment, control computer 26 is a digital computer or other suitable controller or integrated circuit chip or chipset which includes a real time clock for providing time and date information. This information is appended to the position information stored in memory 25 and is provided along with the position information so that data processor station 18 is capable of tracking movement of individual 14 based on the time that the position information was logged.

Cellular transceiver 34 is also capable of receiving cellular communications. Therefore, when data processor station 18 sends an interrogation signal via the cellular network to portable locator 12, the interrogation signal is received, through antenna 36, by cellular transceiver 34. Cellular transceiver 34, in turn, provides the received signal to modem 32. The received signal is demodulated at modem 32 and provided in digital form to control computer 26. Upon receiving the demodulated interrogation signal, control computer 26 performs basically the same functions as if it was requested from operator input device 27 to transmit data. In other words, control computer 26 accesses memory 25 to send requested position information to data processor station 18.

FIG. 3 is a block diagram of data processor station 18. Data processor station 18 includes CRT 38, control computer 40, operator input device 42, modem 44, transceiver 46, cellular communications antenna 47, electronic communicator 48, mapping computer 50, mouse 52 and CRT 54. Transceiver 46 is preferably a cellular transceiver (such as a cellular telephone) in which case it includes antenna 47 or a wire-line transceiver (such as a wire-line telephone) in which case no antenna is utilized. If a communication is initiated by portable locator 12, transceiver 46 receives the position information from portable locator 12. Transceiver 46 provides a modulated signal indicative of the position information to modem 44 which demodulates the signal and provides the position information, in digital form, to control computer 40.

In a preferred embodiment, control computer 40 is a digital computer with associated support circuitry, such as memory and timing circuitry. Control computer 40 displays the position information, and any other relevant information, on CRT 38. Control computer 40 also provides the position information to mapping computer 50 which relates the position information to a map.

In a preferred embodiment, mapping computer 50 is also a digital computer having associated support circuitry. Further, mapping computer 50 is preferably programmed with commercially available mapping software, such as MapExpert 2.0 software commercially available by the DeLorme company. Various selections in the mapping and programming process are accomplished by the operator using mouse 52. It should be noted that mouse 52 can be replaced or accompanied by any suitable operator input device. However a mouse is preferable since the mapping software is provided in a pull down-type format. Mapping computer 50 also displays the position information after it is related to a map, on CRT 54. This essentially provides the operator of mapping computer 50 with a visual map indicating the location of portable locator 12.

In addition, mapping computer 50 sends signals indicative of the mapped position information back to control computer 40. In response, control computer 40 either initiates a cellular or wire line telephone call to responder 20 (shown in FIG. 1) or provides the relevant information to responder 20 via another electronic communicator 48. In the preferred embodiment, electronic communicator 48 is a telefacsimile machine, another computer, or another suitable electronic communicator. Alternatively, or in addition, the operator at data processor station 18, upon viewing the mapped information on CRT 54 calls responder 20.

In the preferred embodiment, the identity and telephone number of responder 20 is provided on CRT 38 once control computer 40 receives the position information from portable locator 12. If portable locator 12 is activated by individual 14 in a normal mode, position information is simply sent to data processor station 18, and control computer 40 lists a plurality of responders 20 which are to be contacted. The responders 20 are preferably listed in order of desired contact. In other words, the operator first attempts to contact the first responder. If the first responder is unavailable, the operator then attempts to contact the second responder, etc. Under such circumstances, the responders are advised that individual 14 has requested them to respond. The responder is also provided with the location of individual 14. The responders are dispatched to that location.

If individual 14 actuates portable locator 12 by initiating an emergency actuation, then control computer 40 determines that an emergency alert signal has been provided by individual 14 and provides a display on CRT 38 that indicates that either the police, or other emergency responders, are to be contacted immediately. Alternatively, or in addition, control computer 40 can iniate such communication with the emergency responder via transceiver 46 or electronic communicator 48. In addition, control computer 40 can provide the emergency responder with the location of individual 14, as well as a map of how to reach individual 14.

If the operator of data processor station 18 is asked to locate individual 14 (or any other object or entity which is carrying portable locator 12), the operator inputs, via operator input device 42, instructions to control computer 40 to interrogate portable locator 12. Control computer 40 then provides an interrogation signal to modem 44 which is to be transmitted via cellular transceiver 46 and a cellular network, to portable locator 12. The interrogation signal provided by control computer 40 (as previously discussed) causes control computer 26 in portable locator 12 to retrieve a desired amount of location information from memory 25 and transmit the information back to data processor station 18. As when individual 14 initiates such communication, the position information is provided from control computer 40 to mapping computer 50 which relates the position information to a map and provides an appropriate output.

Data processor station 18 can also perform a tracking and extrapolation function. Control computer 26 in portable locator 12 is Programmed to periodically store additional information in memory 25 at predetermined time intervals. In a preferred embodiment, the position information is updated in memory 25 every five seconds. However, it should be noted that any suitable interval can be programmed into control computer 26.

Since fifty sets of position information are stored, data processor station 18 can track movement of individual 14 over the past four plus minutes. Based on this movement, data processor station 18 can extrapolate a straight line pattern which indicates expected movement of individual 14. This tracking and extrapolation feature is particularly useful if individual 14 is moving at a high rate of speed and crossing a number of cellular networks, or is moving in and out of cellular networks. This function is also particularly useful should satellite communication be lost for any period of time. Such an extrapolation and tracking function allows data processor station 18 to continue to track individual 14 and portable locator 12, even though only periodic transmissions are being received.

In addition, the update interval, along with the number of update information sets to be stored in memory 25 can be changed and reprogrammed by the operator at data processor station 18. This can all be accomplished remotely through the cellular (or wire-line) network.

It should also be noted that mapping computer 50 or control computer 40 is preferably programmed to save many more than fifty sets of position information. In this way, the control computers can create a map which essentially traces the route of anything carrying portable locator 12, for any amount of time.

Control computer 40 is also preferably programmed with a database containing identification information of all entities carrying portable locators 12. Such information typically includes color, make and model of cars; and weight, height, hair and eye color of people, etc. This information is provided to responder 20 when the responder is dispatched.

Figure 4A:
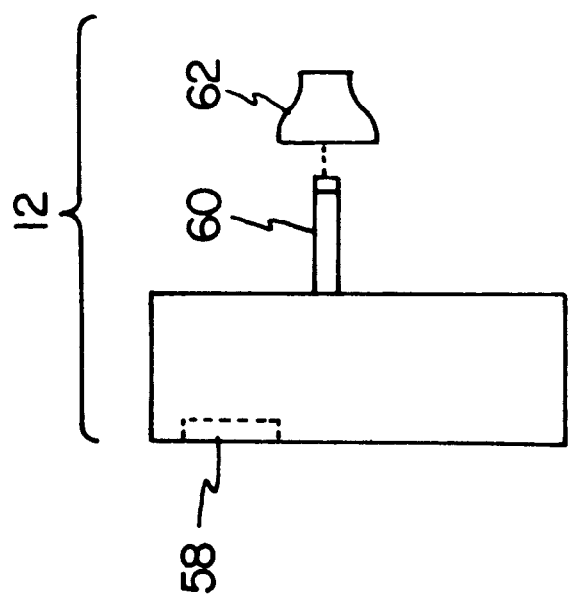
FIG. 4A is a side view of the portable locator unit shown in FIG. 4.
Figure 4:
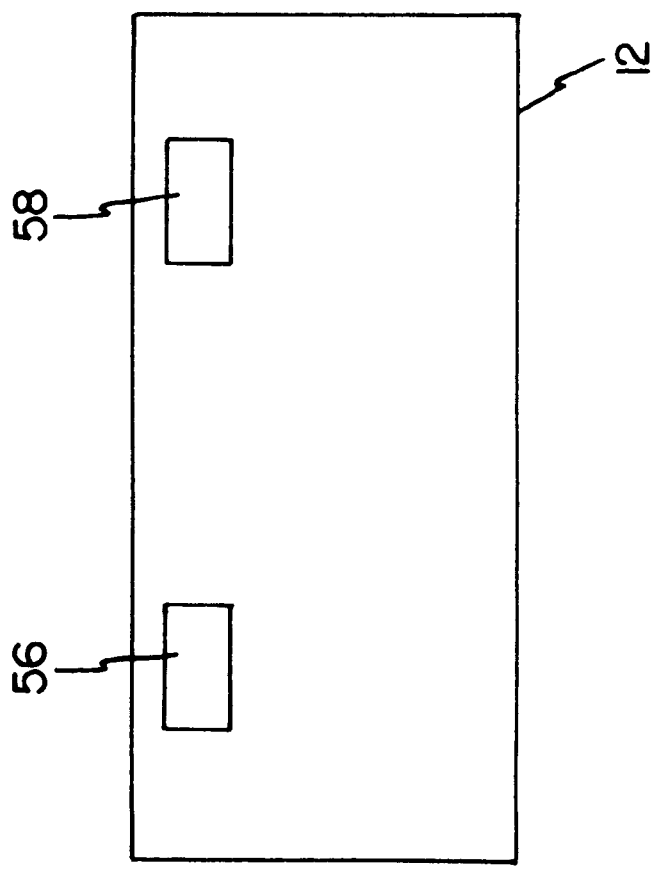
FIG. 4 is an illustration of a portable locator unit according to the present invention.

FIG. 4 is a front view of portable locator 12. In the preferred embodiment, portable locator 12 includes a hard plastic housing which covers the necessary circuitry. Further, portable locator 12 includes a plurality of call buttons 56 and 58. In order to simply send a message that a responder is to be contacted, the operator presses a single call button 56. In order to send a message that a second responder is to be sent, the individual 14 actuates a second call button 58. Further, in the preferred embodiment, the individual 14 can send an emergency message indicating that an emergency responder is to be dispatched to the appropriate location. In this instance, individual 14 presses both buttons 56 and 58 for a predetermined time interval, such as two seconds. Also, buttons 56 and 58 are preferably recessed into the housing to reduce the likelihood of accidental activations.

FIG. 4A is a side view of portable locator 12. The rear of portable locator 12 includes a pin 60 and a female connector 62 which is magnetically connected to pin 60. In the preferred embodiment, the insertion of pin 60 into connector 62 is sensed by control computer 26 by using any suitable sensor such as a magnetic sensor or a magnetic or other switch. Connector 62 is preferably only releasable upon control computer 26 receiving an infrared release signal, or a radio frequency release signal, from a remote (preferably hand held) device. If one attempts to remove connector 62 from pin 60 without control computer 26 first receiving the appropriate release signal, this indicates that the connector is being tampered with and control computer 26 immediately sends an emergency signal to data processor station 18.

It is worth noting that both control computer 40 and mapping computer 50 could easily be integrated into a single computer with the mapping software, communication software and identification information data base loaded into that single computer. This would eliminate the need for one of CRTs 38 and 54. However, should two computers be used, they are typically connected through an appropriate communication link, such as an RS232 serial data port, or an appropriate parallel data port. This allows control computer 40 and mapping computer 50 to be spaced apart from one another.

It should also be noted that the location information can include not only longitude and latitude, but also altitude and speed. The speed is typically calculated by either portable locator 12 or data processor 18 based upon the sets of information stored in memory 25, and the time which elapses between each set of data.

Further, while the present invention has been described primarily with respect to the GPS, any positioning system which provides longitude and latitude coordinates could be used with the present invention. The receiver in portable locator 12 would simply be replaced with an appropriate receiver to accommodate reception of the necessary signals from the positioning system.

Finally, while the present description has been provided with respect to only a single, portable locator 12, any number of portable locators can be used with data processor station 18. Each portable locator 12 is preferably assigned an identifier or address such as a number or alpha-numeric identifier. This identifier is used in communication to and from data processor station 18.

Although the present invention has been described with reference to preferred embodiments, workers skilled in the art will recognize that changes may be made in form and detail without departing from the spirit and scope of the invention.

What is claimed is:

1. A locator system, comprising:
   a portable locator apparatus including:
      a satellite receiver for receiving location information transmitted by a satellite, the location information being indicative of a location of the portable locator; and
      a first cellular transmitter, coupled to the satellite receiver, and adapted to transmit the location information over a cellular network;
   a tracking system having a receiver for receiving the location information transmitted by the first cellular transmitter, the tracking system including a tracking controller adapted to relate the location information to a map to provide a location output indicative of the location of the portable locator; and
   wherein the tracking system further comprises:
   an operator output apparatus, coupled to the tracking controller, for providing the location output to an operator to indicate the location of the portable locator;
   a tracking memory, coupled to the tracking controller, adapted to store response information indicative of a plurality of designated responders to be contacted upon receipt of location information from the portable locator; and
   notifying means for notifying one of the plurality of responders in response to receiving location information from the locator apparatus, the notifying means attempting to notify at least one of the plurality of responders in a specific order.

2. The locator system of claim 1 wherein the tracking system further comprises:
   a transmitter coupled to the tracking controller, and wherein the locator apparatus includes a cellular receiver, coupled to the cellular transmitter in the locator apparatus, the tracking controller providing an interrogation signal to the locator apparatus, the interrogation signal being transmitted by the transmitter in the tracking system and received by the cellular receiver in the locator apparatus, the locator apparatus transmitting the location information in response to the interrogation signal from the tracking controller.

3. The locator system of claim 2 wherein the locator apparatus further includes:
   a locator controller, coupled to the satellite receiver, the cellular transmitter in the locator apparatus, and the cellular receiver in the locator apparatus;
   a locator memory coupled to the locator controller for storing location information; and
   a locator input device for receiving inputs from an operator and providing input signals to the locator controller based on the inputs received from the operator.

4. The locator system of claim 3 wherein the locator controller includes means for receiving a send signal from the locator input device and for retrieving the location information from the memory and causing the cellular transmitter in the locator apparatus to transmit the location information in response to the send signal.

5. The locator system of claim 4 wherein the locator controller includes a real time clock providing a time signal indicative of time and date, and wherein the locator controller stores updated location information in the locator memory at time intervals based on the time signal.

6. The locator system of claim 5 wherein the locator controller causes time and date information corresponding to the location information to be stored in the locator memory.

7. The locator system of claim 6 wherein the locator controller causes an emergency signal to be transmitted by the cellular transmitter in the locator apparatus in response to an emergency input signal provided by the locator input device, wherein the notifying means notifies an emergency responder in response to receiving the emergency signal from the locator apparatus.

8. The locator system of claim 7 wherein the locator apparatus includes:

connection means, for connecting the locator apparatus to an article;

detection means for detecting when the connection means is being disconnected in an unauthorized manner; and means for sending the emergency signal in response to detection of the connector being disconnected in an unauthorized manner.

9. The locator system of claim 1 wherein the specific order is based on an urgency status of the locator information received from the locator apparatus.

10. The locator system of claim 1 wherein the notifying means attempts to notify a responder according to a predetermined order and continues to attempt to notify subsequent responders in the order until a responder has been successfully notified.

11. An apparatus for locating a cellular transmitter which transmits position information, the apparatus comprising:

a receiver for receiving the position information, indicative of the position of the cellular transmitter, the receiver including a memory and a clock providing time and data information, the receiver adapted to receive and store a plurality of sets of position information, along with corresponding time and data information;

a mapping controller adapted to relate the position information to a map to provide a location signal indicative of the present and past location of the cellular transmitter; and an output apparatus adapted to provide an output to an operator indicative of the past and present location of the cellular transmitter, based on the location signal.

* * * * *